United States Patent
Jin et al.

(10) Patent No.: US 8,326,076 B2
(45) Date of Patent: Dec. 4, 2012

(54) IMAGE FORMING APPARATUS HAVING FUNCTION OF ADJUSTING COLOR OF IMAGE AND PRINTING METHOD THEREOF

(75) Inventors: Song-baik Jin, Seoul (KR); Jong-un Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1469 days.

(21) Appl. No.: 11/604,821

(22) Filed: Nov. 28, 2006

(65) Prior Publication Data

US 2007/0154085 A1    Jul. 5, 2007

(30) Foreign Application Priority Data

Dec. 29, 2005    (KR) .................. 10-2005-0134310

(51) Int. Cl.
| | |
|---|---|
| G06K 9/00 | (2006.01) |
| G06K 9/34 | (2006.01) |
| G06K 9/36 | (2006.01) |
| G06K 9/40 | (2006.01) |
| G06T 5/00 | (2006.01) |
| H04N 1/407 | (2006.01) |
| H04N 9/73 | (2006.01) |

(52) U.S. Cl. ........ 382/274; 382/162; 382/167; 382/254; 382/275; 358/3.27; 348/224.1

(58) Field of Classification Search .................. 382/162, 382/254, 274; 345/619–622; 358/3.27; 348/224.1
See application file for complete search history.

(56) References Cited

U.S. PATENT DOCUMENTS

| | | | | |
|---|---|---|---|---|
| 4,851,897 A  * | 7/1989  | Inuma et al. | ............... | 348/224.1 |
| 6,845,218 B2 * | 1/2005  | Miyasaka et al. | ............. | 396/301 |
| 6,937,370 B1 * | 8/2005  | Nitta et al. | ..................... | 358/518 |
| 7,259,786 B2 * | 8/2007  | Shimizu | ..................... | 348/231.6 |
| 7,327,390 B2 * | 2/2008  | Gallagher | .................. | 348/224.1 |
| 7,379,213 B2 * | 5/2008  | Koizumi | ..................... | 358/3.27 |
| 7,436,440 B2 * | 10/2008 | Tagawa | ..................... | 348/231.2 |
| 2004/0021780 A1 * | 2/2004  | Kogan | ..................... | 348/231.3 |
| 2004/0135889 A1 * | 7/2004  | Koizumi et al. | ........... | 348/207.1 |
| 2005/0140815 A1 * | 6/2005  | Nakano et al. | ................ | 348/345 |

FOREIGN PATENT DOCUMENTS

| | | |
|---|---|---|
| JP | 2004-180150 | 6/2004 |
| JP | 2005-033503 | 2/2005 |
| JP | 2005-062993 | 3/2005 |

* cited by examiner

*Primary Examiner* — Matthew Bella
*Assistant Examiner* — Jose M Torres
(74) *Attorney, Agent, or Firm* — Roylance, Abrams, Berdo & Goodman, LLP

(57) ABSTRACT

An image forming apparatus comprising a function for adjusting a color of an image and a printing method thereof are provided, in which an information reading unit extracts information corresponding to a lens of an imaging device from additional information corresponding to an image captured by the imaging device, an information saving unit saves data required for adjusting the color of the image according the information corresponding to the lens of the imaging device, and an image processing unit adjusts the color of the image according to the data. Accordingly, it is possible to print the printing image closer to a natural color by adjusting color differences according to different imaging devices and the color of the image according to the lens information of the imaging device.

19 Claims, 3 Drawing Sheets

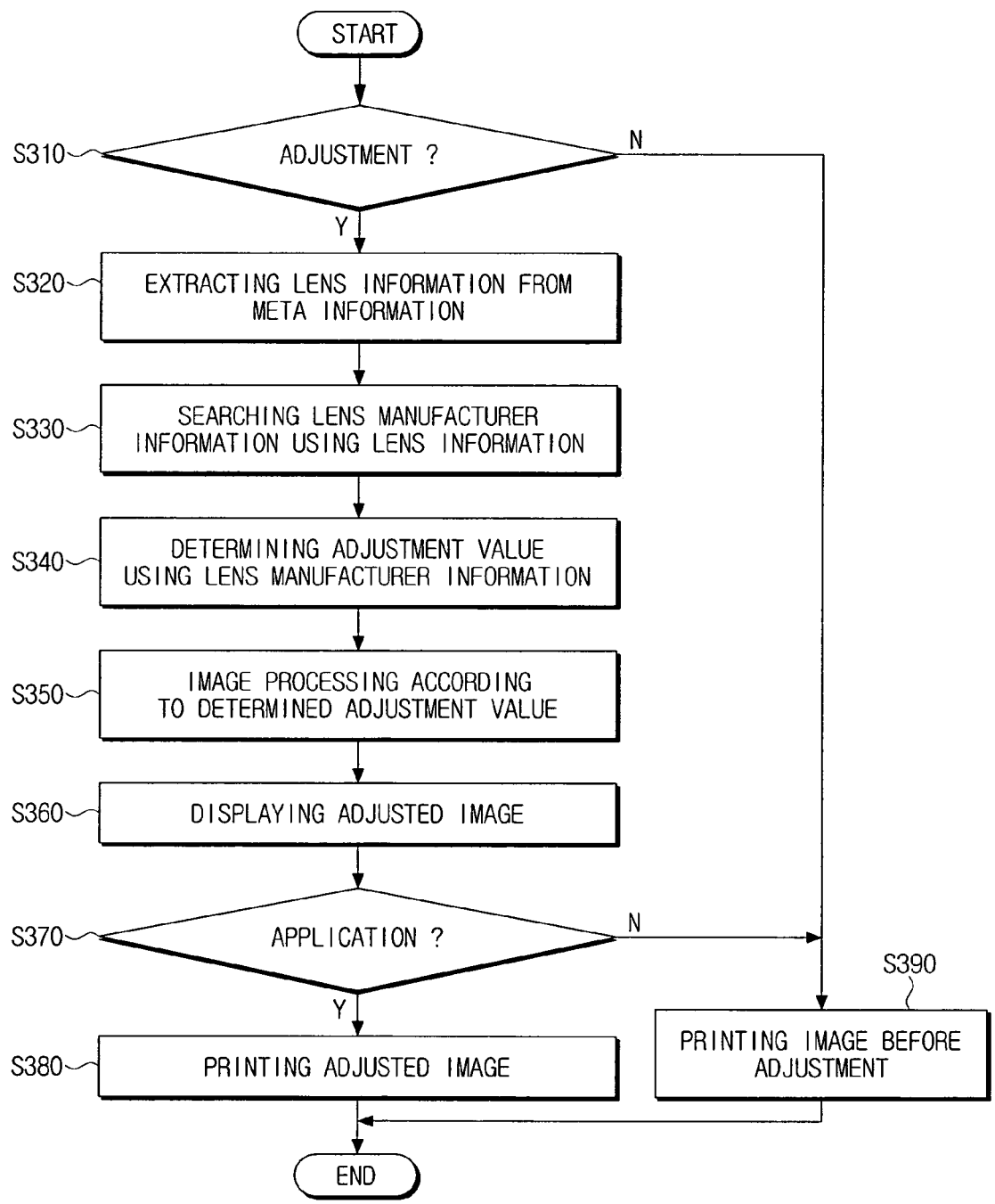

IMAGE FORMING APPARATUS HAVING FUNCTION OF ADJUSTING COLOR OF IMAGE AND PRINTING METHOD THEREOF

CROSS-REFERENCE TO RELATED APPLICATIONS

This application claims the benefit under 35 U.S.C. §119(a) of Korean Patent Application No. 2005-134310, filed Dec. 29, 2005, in the Korean Intellectual Property Office, the entire disclosure of which is hereby incorporated by reference.

BACKGROUND OF THE INVENTION

1. Field of the Invention

The present invention relates to an image forming apparatus having a function for adjusting a color of an image and a printing method thereof. More particularly, the present invention relates to an image forming apparatus having a function for adjusting a color of an image and a printing method thereof, which adjusts color differences according to lens types and prints an image.

2. Description of the Related Art

As digital cameras are increasingly distributed, more users prefer to save an image taken by a digital camera in a storage medium, such as a hard disc drive of an information processing apparatus, such as a personal computer, or print the image on paper through an image forming apparatus for keepsake.

Accordingly, a photo printer, which is an image forming apparatus, has been developed. The photo printer is for digital photo use only, and prints an image saved in the digital camera connected through PictBridge, or prints an image saved in a portable memory card. The image forming apparatus prints a photo on paper similarly to general film photo.

Recent photo printers comprise a function such as a display for displaying an image to be printed before printing, using a built-in liquid crystal display (LCD) of the printer or an external display such as a television (TV) connected to the printer and a monitor. Accordingly, a user can view in advance the image to be displayed, in order to determine whether to print or adjust printing options.

The image taken by the digital camera may have a particular color that is strongly expressed due to difference in a lens feature according to the lens type of various manufacturers. Different colors in an image, such as differences from natural colors, may be caused by differences in lens features such as light transmission or refractive index of lens according to various lens manufacturers.

If the same object is photographed under similar conditions, a "CANNON" lens is formed with an image colored close to the natural color, a "TAMRON" lens is formed with an image greener than other lenses and a "SIGMA" lens forms an image yellower than other lenses.

Differences in color according to each lens type can be viewed on paper printed through the printer, and in preview at the display.

Accordingly, the user may prefer to adjust color differences when the printing image is previewed at the display. However, it is difficult to adjust the color differences through a small LCD on the printer and determine whether the color is adjusted. When a larger external display is used, it is difficult to find such color differences with the naked eye and properly adjust the color differences.

When the color differences are adjusted using an image processing process of an image processing apparatus or the image forming apparatus, the same image processing process is performed regardless of the lens type. Therefore, the image processing process fails to adjust the color differences in the printed image.

Accordingly, there is a need for an improved method and apparatus for adjusting color of an image according to a lens type and manufacturer information.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an image forming apparatus having a function of adjusting a color of an image and a printing method thereof, which adjusts color differences appearing on a captured image, according to lens types.

In order to achieve the above-described aspects of exemplary embodiments of the present invention, there is provided an image forming apparatus having a function for adjusting a color of an image, in which an information reading unit extracts information corresponding to a lens of an imaging device from additional information corresponding to an image captured by the imaging device; an information saving unit saves data required for adjusting the color of the image according to the information corresponding to the lens of the imaging device; and an image processing unit adjusts the color of the image according to the data.

In an exemplary implementation, the data includes information corresponding to a lens manufacturer based on the lens of the imaging device.

In an exemplary implementation, the data includes data for adjusting R (red), G (green) and B (blue) values of the image, corresponding to the lens manufacturer information.

In an exemplary implementation, the additional information comprises Exif (exchangeable image file format for digital still cameras) information added to a file of the image.

In an exemplary implementation, the image forming apparatus further comprises displaying an image having the adjusted color.

The image forming apparatus further comprises a printing engine that prints at least one of the image having the color adjusted and an image before adjustment; and a controlling unit that confirms the image having the color adjusted displayed on the display, judging whether to print the at least one of the image having the color adjusted and the image before adjustment according to a command for printing, input from a user, and controls the printing engine unit according to the judgment.

In order to achieve the above-described aspects of exemplary embodiments of the present invention, there is provided a printing method of an image forming apparatus comprising a function for adjusting a color of an image, in which information corresponding to a lens of an imaging device is read and extracted from additional information of an image, in order to adjust a color of the image captured by the imaging device; stored data corresponding to the information corresponding to the lens of the imaging device is searched and required to adjust the image; and the color of the image is adjusted according to the data.

BRIEF DESCRIPTION OF THE DRAWINGS

The above and other objects, features and advantages of certain exemplary embodiments of the present invention will be more apparent from the following description taken in conjunction with the accompanying drawing, in which;

FIG. 4 is a flowchart explaining a printing operation based on color adjustment, according to an exemplary embodiment of the present invention.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness FIG. 1 is a block diagram of an image forming apparatus having a function for adjusting a color of an image according to an exemplary embodiment of the present invention.

Figure 1:
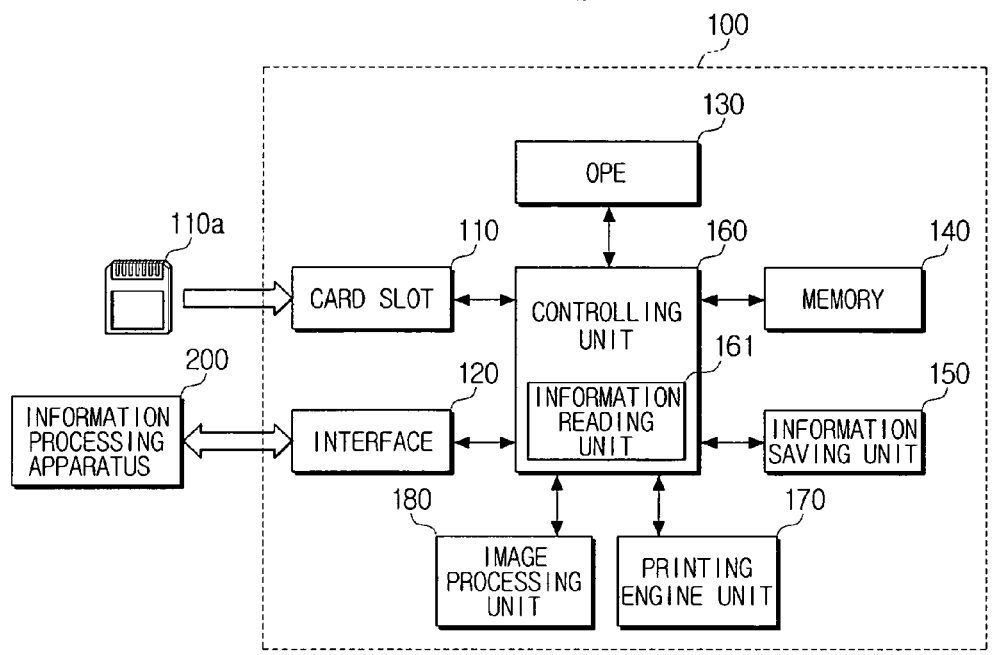
FIG. 1 is a block diagram of an image forming apparatus having a function for adjusting a color of an image according to an exemplary embodiment of the present invention.

Referring to FIG. 1, according to an exemplary embodiment of the present invention, the image forming apparatus 100 includes a card slot 110, an interface 120, an OPE (panel operating unit) 130, a memory 140, an information saving unit 150, a controlling unit 160, a printing engine unit 170 and an image processing unit 180.

The image forming apparatus 100, which is connected to an information processing apparatus or unit 200 or a mobile memory card 110a, receives and prints an image or data.

The card slot 110 is mounted with the portable memory card 110a. However, one or more card slots may be provided. The portable memory card 110a is a flash memory and saves at least one image captured by an imaging device such as a digital camera (not shown).

The portable memory card 110a comprises various types of data storage devices including a MMC (multimedia card), a SM (smart media), a MS (memory stick), a SD (secure digital) card, a CF (compact flash) card and a MD (micro drive) card.

The interface 120 interfaces the controlling unit 160 and an external device, to receive data supplied from the external display or transmit data to the external display from the image forming apparatus 100. The external device may be an information processing apparatus 200, such as a personal computer, and an external display such as a television (TV) and a monitor.

The panel operating unit 130 comprises an inputting unit (not shown) including a plurality of number keys, and function keys and sends to the controlling unit 160 a signal for operating or requesting a function supported by the image forming apparatus 100. Accordingly, the user operates the image forming apparatus 100 to perform color adjustment of the present invention with respect to each image or presets the image forming apparatus 100 to automatically adjust the color of the image without any separate operation through the panel operating unit 130. Also, the user may confirm an adjusted image displayed on a display (not shown) later described, as a result of color adjustment, and input a command for printing the adjusted image or input a command for printing an image before adjusted.

The panel operating unit 130 comprises a display (not shown) generally implemented as a liquid crystal display (LCD) to display an operation state of the image forming apparatus 100. According to an exemplary embodiment of the present invention, the user displays the image through the display (not shown) to see whether the color needs to be adjusted. When the color requires adjustment, the inputting unit (not shown) is operated to adjust the color and the color-adjusted image is displayed.

The memory 140 includes a nonvolatile memory (not shown) saving various control programs required for implementing a function of the image forming apparatus 100, and a volatile memory (not shown) saving various data programs loaded from the nonvolatile memory (not shown) to be executed by the controlling unit or generated during operation of the image forming apparatus 100. The nonvolatile memory (not shown) saves a program supporting an Exif (exchangeable image file format for digital still cameras) standard to operate an information reading unit 161 which both will be described later.

The information saving unit 150 is the nonvolatile memory, like a flash memory, which stores data required for color adjustment according to an exemplary embodiment of the present invention. For example, the information saving unit 150 saves information for reading a lens type for various digital cameras on the market (hereinafter, referred to as 'lens information'), manufacturer information according to corresponding lens information, lens features according to various lens manufacturers and color expression features of different images, and data required to adjust an image color closer to a natural color, for example, data for adjusting R (red), G (green) and B (blue) values.

That is, the information saving unit 150 saves the lens information illustrated in diagram 1 and manufacturer information of the lens corresponding to the lens information. The information reading unit 161 described later reads the manufacture information of the lens, by use of lens information extracted from an image file.

| Diagram 1 | | | |
|---|---|---|---|
| Sigma | Nikon | Cannon | Tamron |
| 18-70 mm F/3.5-4.5G | 70-300 mm F/4-5.6D | 70-300 mm F/4-5.6D | |

The information saving unit 150 saves data values for image adjustment according to a digital camera manufacturer and lens features in a form of a look-up table. Diagram 2 is one example of the look-up table, below.

| Diagram 2 | | | | |
|---|---|---|---|---|
| Adjustment ratio | Sigma | Nikon | Cannon | Tamron |
| | −1% | +2% | +2% | +1% |
| | −1% | +1% | +1% | 0% |
| | +3% | +1% | +2% | −3% |

The look-up table in Diagram 2 and data for adjusting R, G and B values are one example. However, various changes in form and details of the look-up table may be made.

Generally, the R, G and B values range from 0 through 255 levels. For example, if it is determined to adjust an image captured by "Tamron" lens by subtracting B value by 3% in an experiment, it may be desirable to process the image by subtracting the B values of each pixels of the image by 3%. According to the data indicated in the look-up table, for example, if R, G and B values of pixels are 100, 151 and 100, then R, G and B adjustment values according to color adjustment are 101, 151 and 97.

Such information may be preset to input as experimental values, and stored as a list corresponding to manufacturer information such as lens name or lens manufacture, in order to help the controlling unit 160 to search the information easily.

According to an exemplary embodiment of the present invention; the data required for color adjustment is stored in the information saving unit 150 as a separate memory, but it is also possible to save the nonvolatile memory (not shown) of the memory 140.

The controlling unit 160 controls an overall operation of the image forming apparatus 100 according to a control program stored in the memory 140. The controlling unit 160 includes the information reading unit 161 extracting lens information of an imaging device such as a digital camera, by extracting the Exif information from the image file. The Exif is a type of meta data and employed by most digital cameras. Accordingly, the Exif information is stored in the image file with an image as additional information, and includes detailed information such as a manufacturer, imaging date, shutter speed, iris value, zoom magnification and selection of flash use.

Figure 3:
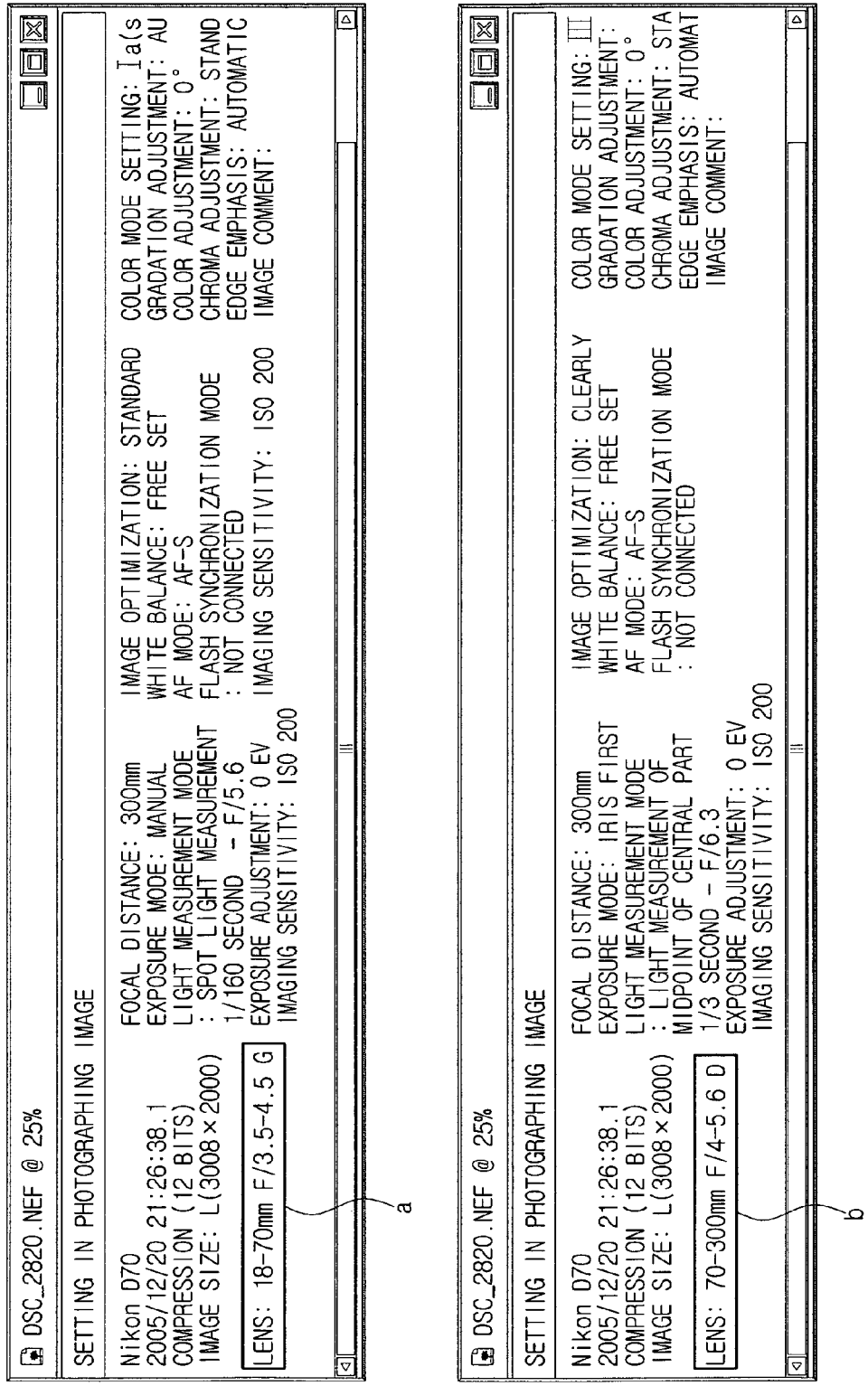
FIG. 3 explains a printing operation according to an exemplary embodiment of the present invention.

FIG. 3 is one example of the Exif information extracted from the image file by the information reading unit 161 by use of a separate program.

Referring to FIG. 3, one example of the Exif information extracted from two image files is illustrated. Two pieces of lens information (a and b) included in each pieces of Exif information are "18-70 mm F/3.5-4.5 G" and "70-300 mm F/4-5.6 D". The information reading unit 161 extracts the lens information from the Exif information.

The printing engine unit 170 prints image data generated by the image processing unit 180, which will be described later. When the image data having color adjusted by the image processing unit 180 is printed on paper for photo use, the user may obtain a print where color differences according to different lens features are adjusted to express colors closer to the natural color.

The image processing unit 180 signal-processes into printable image data the image stored in the mobile memory card 110a or the image transmitted from the external apparatus, such as the information processing apparatus 200, in order to generate the image data. That is, digital-signal processing such as scaling, gamma conversion and error diffusion is performed.

According to an exemplary embodiment of the present invention, the controlling unit 160 searches the information saving unit 150 according to the lens information of the imaging device provided by the information reading unit 161, and confirms a corresponding lens manufacturer. Based on the confirmed lens manufacturer, data for adjusting the image, for example, data for adjusting R, G and B values, is searched from the look-up table stored in the information saving unit 150 and provided to the image processing unit 180.

The image processing unit 180 determines adjustment values having R, G and B values of each pixels adjusted according to data values for adjusting the image provided from the controlling unit 160. The image processing unit 180 then processes the image for adjusting the color according to the lens manufacturer.

Figure 2:
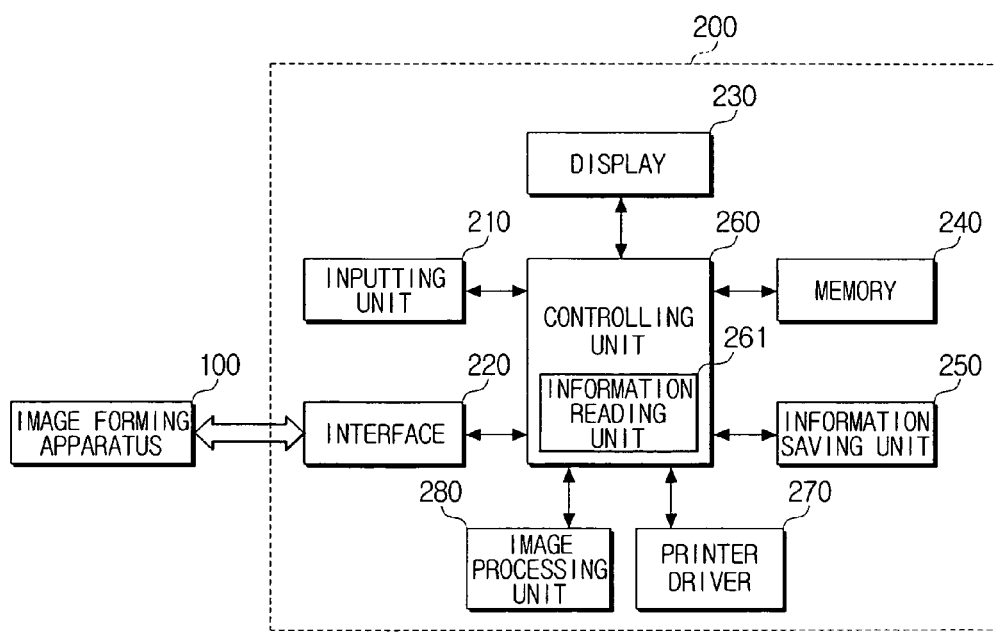
FIG. 2 is a block diagram of an image forming system having a function for adjusting a color of an image according to an exemplary embodiment of the present invention.

FIG. 2 is a block diagram of an image forming system having a function for adjusting a color of an image according to an exemplary embodiment of the present invention.

According to an exemplary embodiment of the present invention, the image forming system includes an image forming apparatus 100 and an information processing unit 200. The information processing unit 200 processes various images including color adjustment of an image captured by the imaging device, such as a digital camera, to generate printing data. The image processing unit 200 transmits the generated printing data to the image forming apparatus 100 for printing.

Referring to FIG. 2, the information processing apparatus 200 includes an inputting unit 210, an interface 220, a display 230, a memory 240, an information saving unit 250, a controlling unit 260, a printer driver 270 and an image processing unit 280.

The inputting unit 210 receives various user commands and provides corresponding signals to the controlling unit 260. The controlling unit 260 controls the information processing apparatus 200 corresponding to the signals based on the received user commands. The inputting unit 210 may be a keyboard and a mouse. According to an exemplary embodiment of the present invention, if a command for color adjustment of the image is input through the inputting unit 210, the controlling unit 260 controls the image processing unit 280 to process the image for color adjustment.

The interface 220, which is wire or wireless connected to the image forming apparatus 100, interfaces between the image forming apparatus 100 and the controlling unit 260, and transmits to the image forming apparatus 100 the printing data of the image comprising color adjusted, such that the image forming apparatus 100 prints the printing data.

The display 230 displays the image, corresponding to the user command or under control of the controlling unit 260. The user confirms with the display 230 to see whether the color of the image needs to be adjusted. When the color of the image needs an adjustment, the command for adjustment of the color is input.

The memory 240 has a nonvolatile memory (not shown) stored with various control programs required for implementing a function of the information processing apparatus 100 including a program supporting Exif (exchangeable image file format for digital still cameras) standard for operating the information reading unit 261, and a volatile memory (not shown) stored with various data generated during operating of the information processing unit 100.

The information saving unit 250 saves data required for color adjustment, for example, lens manufacturer information based on lens information, and a look-up table indicating data for adjusting R, G and B based on the lens manufacturer information. The data required to adjust the color may be saved in an area of the nonvolatile memory (not shown) of the memory 240.

The controlling unit 260 controls overall operations of the image forming apparatus 100 according to the control programs stored in the memory 240. The controlling unit 260 includes an information reading unit 261 operating according to the Exif program stored in the memory 240, and extracts the Exif information from the image file and information on a lens of an image device, such as the digital camera. Based on the extracted Exif information and the lens information, the controlling unit 260 searches the information saving unit 250 and confirms the lens manufacturer.

The controlling unit 260 searches the information saving unit 250 according to the lens manufacturer information of the imaging device and provides to the image processing unit 280 the data for color adjustment of the corresponding image, so that the color of the image is adjusted.

The printer driver 270 converts the image into the printing data recognizable at the image forming apparatus 100.

The image processing unit 280 performs various digital signal processing processes of the image to generate the image data, and transmits the generated image data to the image forming apparatus 100 through the interface 220. The image processing unit 280 calculates adjustment values of R, G and B values of each pixels according to image adjustment under the control of the controlling unit 260, and performs an image processing process for color adjustment based on the lens manufacturer.

FIG. 4 is a flowchart explaining a color adjustment operation according to an exemplary embodiment of the present invention.

Controlling units 160, 260 determine whether a command for color adjustment is input together with a command for image printing according to a control signal from a panel operating unit 130 or an inputting unit 210 (S310). The command for color adjustment may be preset to adjust the color of all the images when printing data is generated, without requiring a separate command for color adjustment, if the command for image printing is input.

If the command for the color adjustment is input, the controlling units 160, 260 controls information reading units 161, 261 to extract meta data of an image file, for example, Exif information (exchangeable image file format for digital still cameras) and read lens information of an imaging device capturing the corresponding image from the extracted Exif information (S320).

The controlling units 160, 260 search information saving units 150, 250 according to the lens information of the imaging device, and confirm the lens manufacturer information (S330). The controlling units 160, 260 search the data that requires color adjustment of the image and provide the searched data to image processing units 180, 280. The image processing units 180, 280 determine an adjustment value of the color of the corresponding image (S340), and process the image for adjusting the color of the corresponding image according to the determined adjustment value (S350).

When the color of the corresponding image is adjusted, the controlling units 160, 260 display the color-adjusted image on a display (not shown) of the panel operating unit 130 or a display 230 (S360), and a user may confirm whether the color of the image is adjusted.

If the user confirms the image displayed on the display (not shown) of the panel operating unit 130 or the display 230 and inputs the command for printing based on the confirmed image, the controlling units 160, 260 determines whether to apply as prints the image adjusted according to the input signal from the inputting unit (not shown) of the panel operating unit 130 or the inputting unit 210 (S370).

When the color-adjusted image is applied as prints, the image forming apparatus 100 prints the color-adjusted image through a printing engine unit 170, as illustrated in the display (not shown) of the panel operating unit 130 or the display 230 (S380). When the color-adjusted image is not applied as prints, the image forming apparatus 100 prints the image before adjustment (S390).

As described above, according to exemplary embodiments of the present invention, an image forming apparatus having a function for adjusting a color of an image and a printing method thereof, extracts lens information of an imaging device from an Exif (exchangeable image file format for digital still cameras) information and adjusts an image of a color according to lens manufacturer information based on the extracted lens information, in order to print a printing image having image color differences compensated according to the lens manufacturer. Thus, an image of color can be closer to a natural color.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

Accordingly, color differences may be removed according to different lens manufacturers in order to precisely adjust the color of the image by performing adjustment of the color of the image according to the lens manufacturer information of the imaging device without requiring a user's separate operation.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image forming apparatus for adjusting color of an image, the apparatus comprising:
   an information reading unit for extracting information corresponding to a lens of an imaging device from additional information corresponding to an image captured by the imaging device;
   an information saving unit for saving data required for adjusting the color of the image according to the information corresponding to the lens of the imaging device; and
   an image processing unit for adjusting the color of the image according to the data;
   wherein the data includes information corresponding to a lens manufacturer of the lens of the imaging device and color adjustment information corresponding to the lens manufacturer information; and
   wherein the color adjustment information corresponding to the lens manufacturer information is pre-produced previously and stored in the information saving unit.

2. The image forming apparatus of claim 1, wherein the color adjustment information includes data for adjusting R(red), G(green) and B(blue) values of the image, corresponding to the lens manufacturer information.

3. The image forming apparatus of claim 1, wherein the additional information comprises exchangeable image file format for digital still cameras (Exif) information added to a file of the image.

4. The image forming apparatus of claim 1, further comprising a display for displaying an image comprising the color adjusted.

5. The image forming apparatus of claim 4, further comprising:
  a printing engine for printing at least one of the image comprising the color adjusted and an image before adjustment; and
  a controlling unit for confirming the image comprising the color adjusted displayed on the display, determining whether to print the at least one of image comprising the color adjusted and the image before adjustment according to an input command for printing, and controlling the printing engine unit according to the determination.

6. A printing method of an image forming apparatus for adjusting color of an image, the method comprising:
  reading information corresponding to a lens of an imaging device from an additional information of an image captured by the imaging device, to adjust color of the image;
  searching stored data corresponding to the information corresponding to the lens of the imaging device and required to adjust the image; and
  adjusting the color of the image according to the data;
  wherein the data includes information corresponding to a lens manufacturer of the lens of the imaging device and color adjustment information corresponding to the lens manufacturer information; and
  wherein the color adjustment information corresponding to the lens manufacturer information is pre-produced previously and stored.

7. The printing method of claim 6, wherein the color adjustment information includes data for adjusting R(red), G(green) and B(blue) values of the image, corresponding to the lens manufacturer information.

8. The printing method of claim 6, wherein the additional information comprises exchangeable image file format for digital still cameras (Exif) information added to a file of the image.

9. The printing method of claim 6, further comprising displaying the image comprising the adjusted color.

10. The printing method of claim 9, further comprising:
  confirming the image comprising the color adjusted displayed on the display;
  determining whether to print the at least one of image comprising the color adjusted and an image before adjustment; and
  printing the at least one of the image comprising the color adjusted and the image before adjustment according to the determination.

11. A non-transitory computer-readable medium storing a computer program code for performing a printing method of an image forming apparatus comprising a function for adjusting color of an image, the method comprising:
  reading information corresponding to a lens of an imaging device from an additional information of an image captured by the imaging device, to adjust color of the image;
  searching stored data corresponding to the information corresponding to the lens of the imaging device and required to adjust the image; and
  adjusting the color of the image according to the data;
  wherein the data includes information corresponding to a lens manufacturer of the lens of the imaging device and color adjustment information corresponding to the lens manufacturer information; and
  wherein the color adjustment information corresponding to the lens manufacturer information is pre-produced previously and stored.

12. The printing method of claim 11, wherein the color adjustment information includes data for adjusting R(red), G(green) and B(blue) values of the image, corresponding to the lens manufacturer information.

13. The printing method of claim 11, wherein the additional information comprises exchangeable image file format for digital still cameras (Exif) information added to a file of the image.

14. The printing method of claim 11, further comprising displaying the image comprising the adjusted color.

15. The printing method of claim 14, further comprising:
  confirming the image comprising the color adjusted displayed on the display, determining whether to print the at least one of image comprising the color adjusted and an image before adjustment; and
  printing the at least one of the image comprising the color adjusted and the image before adjustment according to the determination.

16. An image forming apparatus for adjusting color of an image, the apparatus comprising:
  an information reading unit for extracting information corresponding to a lens of an imaging device from exchangeable image file format for digital still cameras (Exif) information added to a file of the image corresponding to an image captured by the imaging device; and
  an information saving unit for saving data required for adjusting the color of the image according to the information corresponding to the lens of the imaging device;
  wherein the data includes information corresponding to a lens manufacturer of the lens of the imaging device and color adjustment information corresponding to the lens manufacturer information; and
  wherein the color adjustment information corresponding to the lens manufacturer information is pre-produced previously and stored in the information saving unit.

17. The image forming apparatus of claim 16, further comprising an image processing unit for determining adjustment values for adjusting the color of the image according to the data.

18. The image forming apparatus of claim 16, wherein the color adjustment information includes data for adjusting R(red), G(green) and B(blue) values of the image, corresponding to the lens manufacturer information.

19. The image forming apparatus of claim 16, further comprising:
  a printing engine for printing at least one of the image comprising the color adjusted and an image before adjustment; and
  a controlling unit for confirming the image comprising the color adjusted displayed on the display, determining whether to print the at least one of image comprising the color adjusted and the image before adjustment according to an input command for printing, and controlling the printing engine unit according to the determination.

* * * * *